UNITED STATES PATENT OFFICE.

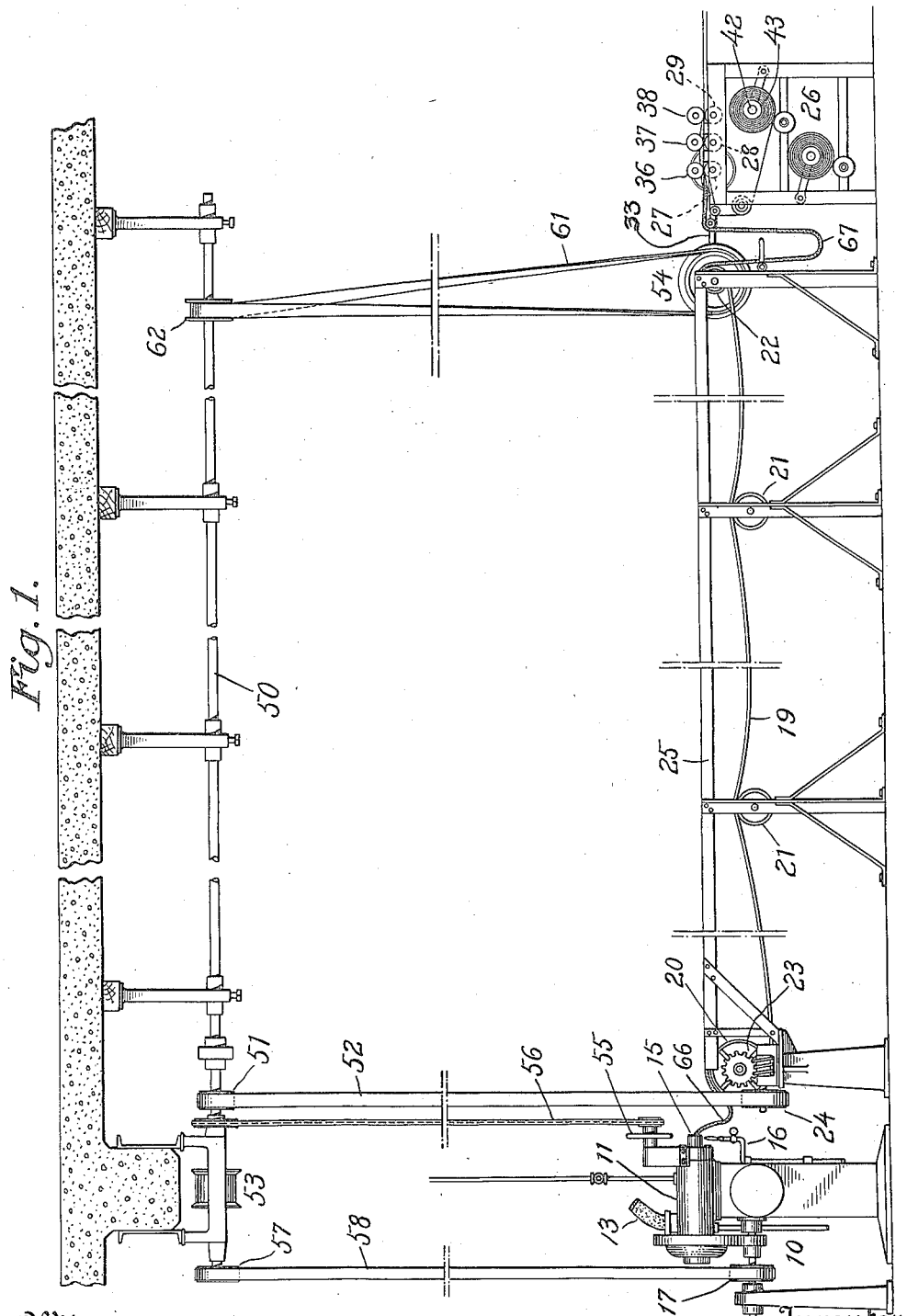

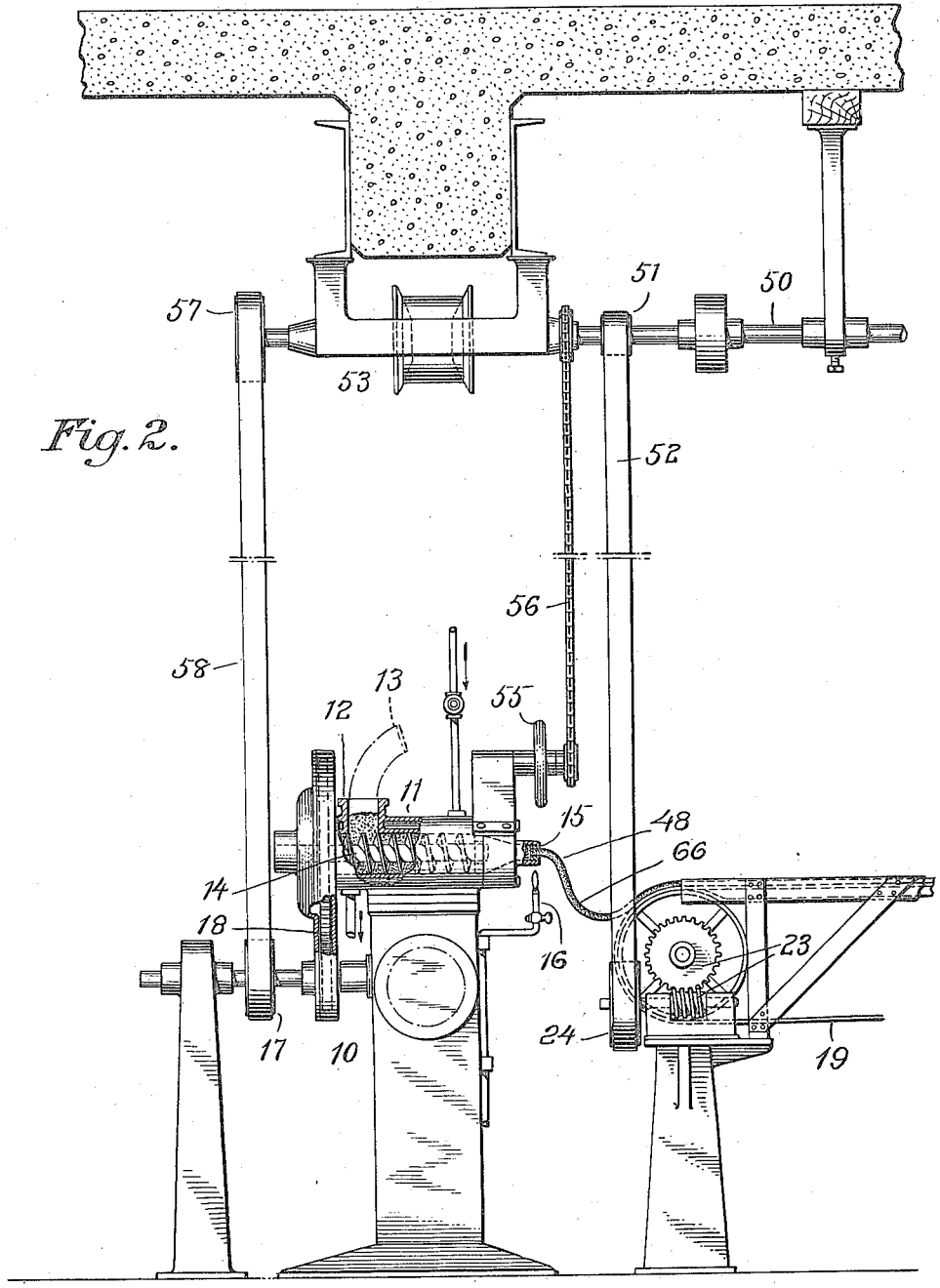

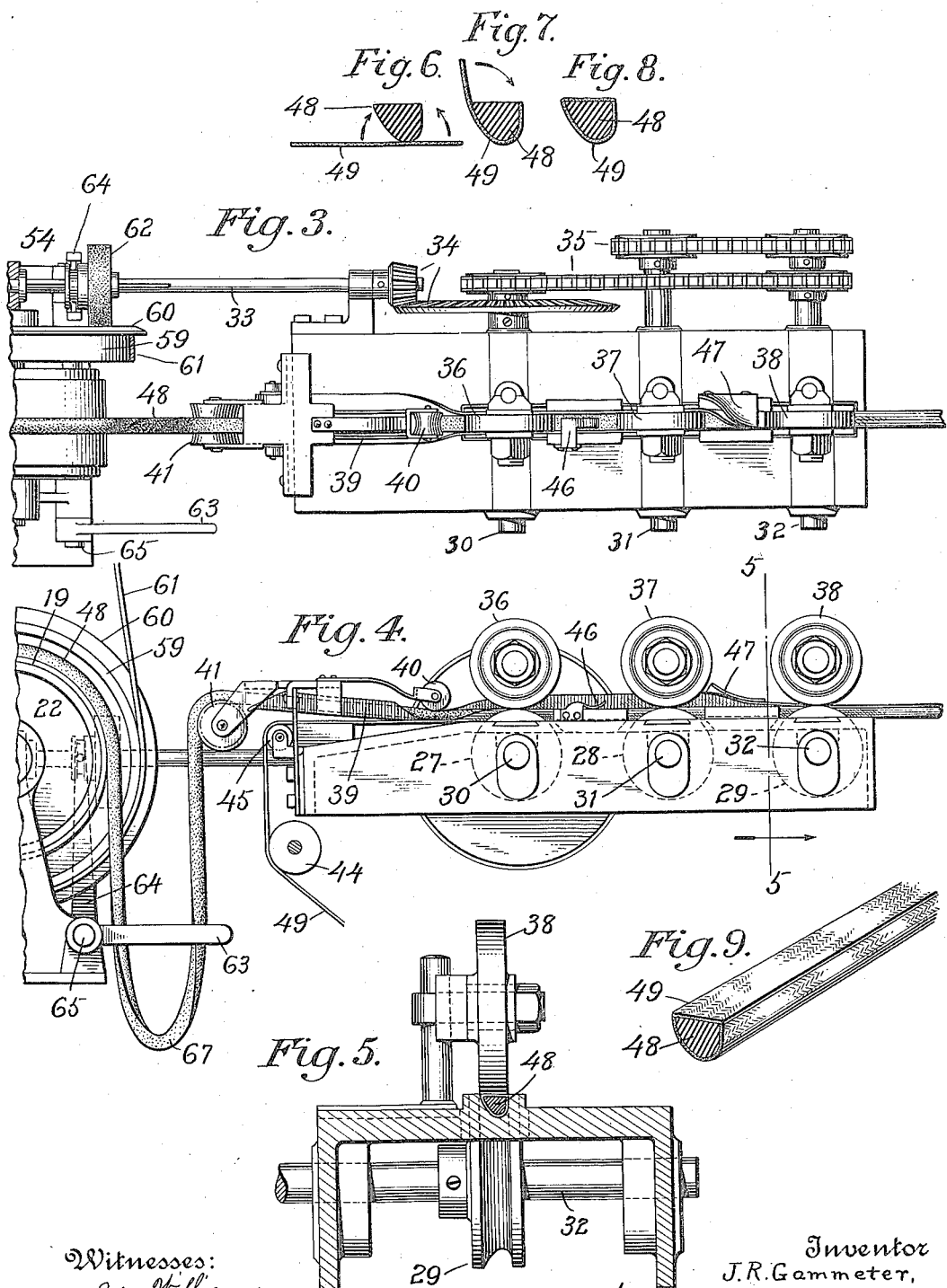

JOHN R. GAMMETER, OF AKRON, OHIO, ASSIGNOR TO THE B. F. GOODRICH COMPANY, OF NEW YORK, N. Y., A CORPORATION OF NEW YORK.

RUBBER-BEAD FORMING AND COVERING APPARATUS.

1,137,127.

Specification of Letters Patent. Patented Apr. 27, 1915.

Application filed June 23, 1913. Serial No. 775,301.

*To all whom it may concern:*

Be it known that I, JOHN R. GAMMETER, a citizen of the United States, residing at Akron, in the county of Summit and State of Ohio, have invented certain new and useful Improvements in Rubber-Bead Forming and Covering Apparatus, of which the following is a specification.

This invention relates to means for covering with fabric a strip or core composed of or containing rubber or other plastic substance. Covered strips of this kind are used, for example, in making the clencher beads of pneumatic tire shoes, a common method being to form the core by squirting a vulcanizable gum compound through a heated die and breaking or cutting it off into lengths corresponding to the length of the vulcanizing presses, these lengths of core being afterward covered with fabric by hand. Owing to the fact that the cores have been allowed to cool and lose much of their surface adhesiveness before being covered, it has heretofore been necessary to coat them with rubber cement before applying the fabric covering in order to make the latter adhere, and these cement-coated cores have to be placed in racks to allow the cement to partially dry before applying the fabric. Such a process is relatively slow, and is also expensive, as it requires a great deal of hand labor besides the cost of the cement and equipment.

My present invention has for its object to furnish a means for covering the gum strip or core, which shall be much quicker and cheaper than the old method and afford a better product. This I accomplish by making and covering the plastic gum core in a continuous strip of any desired length, and applying the fabric covering while the surface of the core is still in a sufficiently plastic condition to produce a firm adhesion to the cover, the latter preferably having a frictioned coat of rubber compound applied to its inner surface.

Of the accompanying drawings, Figure 1 represents a side elevation of a bead forming and covering apparatus embodying my invention. Fig. 2 represents an elevation, partly in section, showing the squirting machine and adjacent parts. Fig. 3 represents a plan view of the covering mechanism. Fig. 4 represents a side elevation thereof. Fig. 5 represents a section on the line 5—5 of Fig. 4. Figs. 6, 7, and 8 represent sectional views showing successive stages in the covering of the strip. Fig. 9 represents a perspective view of a portion of the covered strip.

The complete apparatus comprises a mechanism for squirting or extruding the plastic gum in the form of a core of the desired cross-section, a mechanism for continuously wrapping a cover-strip about said core, a conveyer interposed between the core-forming and core-covering mechanisms, for supporting the core during its travel and exposing it to the atmosphere a sufficient length of time to effect a partial cooling and hardening of its surface, a speed-changing device for varying the speed of the squirting mechanism relatively to that of the conveyer, and a second speed-changing device for varying the speed of the covering mechanism relatively to that of the conveyer.

I believe the invention to reside particularly in the combination and coördination of these several devices with each other in groups and sub-groups for accomplishment of the purposes in view, and the various elements may therefore have any construction suited to those purposes. The drawings and the following detailed description are to be taken merely as illustrating a preferred mode of carrying the invention into effect.

Referring to the drawings, 10 is a bead-squirting mechanism comprising a steam-jacketed casing 11 with an inlet 12 into which pieces of gum compound 13 are fed by hand, a worm or screw 14 therein, and an outlet die 15 heated by a gas-jet 16, the worm being driven by a belt-pulley 17 through suitable gearing 18. This mechanism is of the type commonly known as a "tube machine" and although the die here represented is of a form adapted to extrude a solid strip or bead, the die could be made to form a gum tube, and my invention applies to the covering of such a tube as well as strips of various cross-sectional forms, with one or more layers of fabric.

19 is a conveyer belt passing around suitable driving and idle pulleys 20, 21, 22, the driving pulley being operated through suitable gearing 23 from a belt-pulley 24, and the upper stretch of the belt being supported by a platform 25.

26 is the covering mechanism, which includes the three lower rolls 27, 28, 29 grooved to conform to the shape of the bead and mounted on shafts 30, 31, 32, which are driven from the shaft 33 thruogh bevel gearing 34, and chain-and-sprocket gearing 35; presser-rolls 36, 37, 38, mounted above the grooved rolls; a trough-shaped leading-in guide 39, presser-roll 40 and advance guide-roll 41 for the core; a spindle 42 for supporting the cover-strip reel 43; guide-rolls 44, 45 for the cover strip; a fixed guard plate 46 between the first and second pairs of covering rolls to hold down the core, and a fixed fabric-turning plate 47 between the second and third pairs of covering rolls for turning over the longer side of the cover-strip which has been turned up by the grooved roll 27, the final pressure being applied to the top and bottom portions of the covered bead by the rolls 29, 38. The rolls and guides of the covering mechanism may be variously formed and mounted to conform to the particular cross-sectional shape of the bead or core-strip.

48 is the core and 49 the cover-strip of the bead, the successive steps in applying the cover being represented in Figs. 6, 7, 8.

50 is an overhead power shaft having a pulley 51 connected by a belt 52 with the pulley 24, so that the conveyer belt 19 is driven at a constant speed from said shaft 50. The squirting mechanism 10 and the covering mechanism 36 are connected with the main shaft 50 by speed-changing devices 53, 54, so that their speed may be adjusted relatively to that of the conveyer. The speed-changer 53 is of a familiar type including a pair of reciprocally adjustable cone pulleys of variable diameter (only one of which is shown) connected by a cleated belt and controllable by a hand-wheel 55 through a sprocket-and-chain connection 56. This mechanism being of familiar form is not represented in detail, but it will be understood that its driving shaft is a continuation of the power-shaft 50, its driven shaft is provided with a pulley 57 connected by a belt 58 with the pulley 17 of the squirting machine, and its controlling shaft is operated by the hand-wheel 55.

The speed-changer 54 includes a pulley 59 attached to a friction disk 60 and driven by a belt 61 from a pulley 62 on the main shaft 50, together with a friction wheel 62 splined to the shaft 33 of the covering mechanism and movable across the face of the disk 60 by a hand-lever 63 and fork 64 attached to a rock-shaft 65.

In operating this apparatus, the control of the speed of the squirting and covering mechanisms 10, 26 relative to that of the conveyer belt 19, which is afforded by the speed-changers 53 and 54, enables the core-forming and covering operations to be carried on continuously and effectively. The core 48 hangs down in a loop 66 between the conveyer and the die of the squirting machine, and it hangs down in another loop 67 between the conveyer and the covering machine, so that the attendants at the two ends of the conveyer may have a margin of time for readjusting the speeds of the squirting or covering mechanisms if required. The movable core which leaves the squirting machine gains in strength by partial cooling while being transported on the conveyer belt 19, but remains sufficiently plastic and adhesive to acquire a firm union with the fabric cover-strip which, as previously stated, is preferably provided with a frictioned coat of rubber compound on its inner surface.

I claim:

1. An apparatus of the character described comprising a mechanism for continuously extruding a core of plastic material, a mechanism for continuously applying a fabric cover to said core, and means for supporting and exposing said core to the atmosphere between said mechanisms.

2. An apparatus of the character described comprising a mechanism for continuously extruding a core of plastic material, a mechanism for continuously applying a fabric cover to said core, and a positively-driven conveyer interposed between said mechanisms, for supporting said core.

3. An apparatus of the character described comprising a mechanism for continuously forming a plastic strip, a conveyer for supporting and advancing the formed strip, means for driving said mechanism and said conveyer, means for varying their relative speed, and means for continuously covering with fabric the strip delivered by said conveyer.

4. An apparatus of the character described comprising a conveyer for supporting and advancing a plastic core, a mechanism for covering said core with fabric, means for driving said conveyer and said mechanism, and means for varying their relative speed.

5. An apparatus of the character described comprising a mechanism for continuously forming a plastic core, a mechanism for continuously applying a fabric cover to said core, a conveyer for supporting and advancing the core between said mechanisms, means for driving said mechanisms and said conveyer, and means for varying the speed of the core-forming mechanism and the speed of the covering mechanism relatively to that of the conveyer.

6. An apparatus of the character described comprising a plastic-core squirting machine, a core-covering machine, an interposed conveyer, a power-shaft adapted to drive said conveyer at a constant speed and also connected to drive the squirting and covering mechanisms, and speed-changers included in the driving connections between the last-said mechanisms and the power-shaft.

7. An apparatus of the character described comprising a conveyer, core-squirting and core-covering mechanisms separated from the receiving and delivering ends of said conveyer by free spaces permitting the core to hang down in loops, means for driving said mechanisms and said conveyer, and means for independently varying the speeds of the respective mechanisms relatively to that of the conveyer.

In testimony whereof I have hereunto set my hand, in the presence of two subscribing witnesses, this twelfth day of June, 1913.

JOHN R. GAMMETER.

Witnesses:
 WALTER K. MEANS,
 ILLA N. KIRN.